(No Model.)

DE LOS RICH.
FIRE ESCAPE.

No. 584,403. Patented June 15, 1897.

Witnesses:
Richard C. Maxwell.
Wilhelm Vogt

Inventor:
De Los Rich,
By J. Walter Douglass.
Attorneys.

UNITED STATES PATENT OFFICE.

DE LOS RICH, OF PHILADELPHIA, PENNSYLVANIA.

FIRE-ESCAPE.

SPECIFICATION forming part of Letters Patent No. 584,403, dated June 15, 1897.

Application filed August 13, 1896. Serial No. 602,607. (No model.)

*To all whom it may concern:*

Be it known that I, DE LOS RICH, a citizen of the United States, residing at the city of Philadelphia, in the county of Philadelphia and State of Pennsylvania, have invented certain new and useful Improvements in Fire-Escapes, of which the following is a specification.

My invention has relation to a portable fire-escape.

The principal object of my invention is to provide a simple, reliable, and effective hand friction-applied fire-escape.

My invention consists, first, of a fire-escape having a reel or spool embraced within a hinged two-part holder provided with grips having a tightening screw-bolt, whereby friction on the reel or spool is controlled to increase or decrease the rotation of the same within said holder to permit of the regulation of a wire or cord wound upon said spool or reel, whereby descent of a person with safety from a burning building is insured; secondly, of a hinged hand gripping-holder for embracing a grooved spool or reel carrying a wire or cord provided with a grappling-hook for engaging the framework of a building adjacent to an opening or window and operated by the pressure brought to bear by the hand-grips of the hinged holder embracing the grooved peripheral portions of the wire or cord carrying reel or spool to afford a safe descent of a person suspended by one or both hands from the device, and, thirdly, of a fire-escape of the character described having hand-crank key provided with a pin or stud adapted to engage the reel or spool of the device to permit of the ready winding of the wire or cord around the same, so that a handy or portable appliance may be had that can be carried, if need be, in a satchel or grip for use as occasion may require in a building for escaping therefrom.

The nature and scope of my invention will be more fully understood from the following description, taken in connection with the accompanying drawings, forming part hereof, in which—

Figure 1:
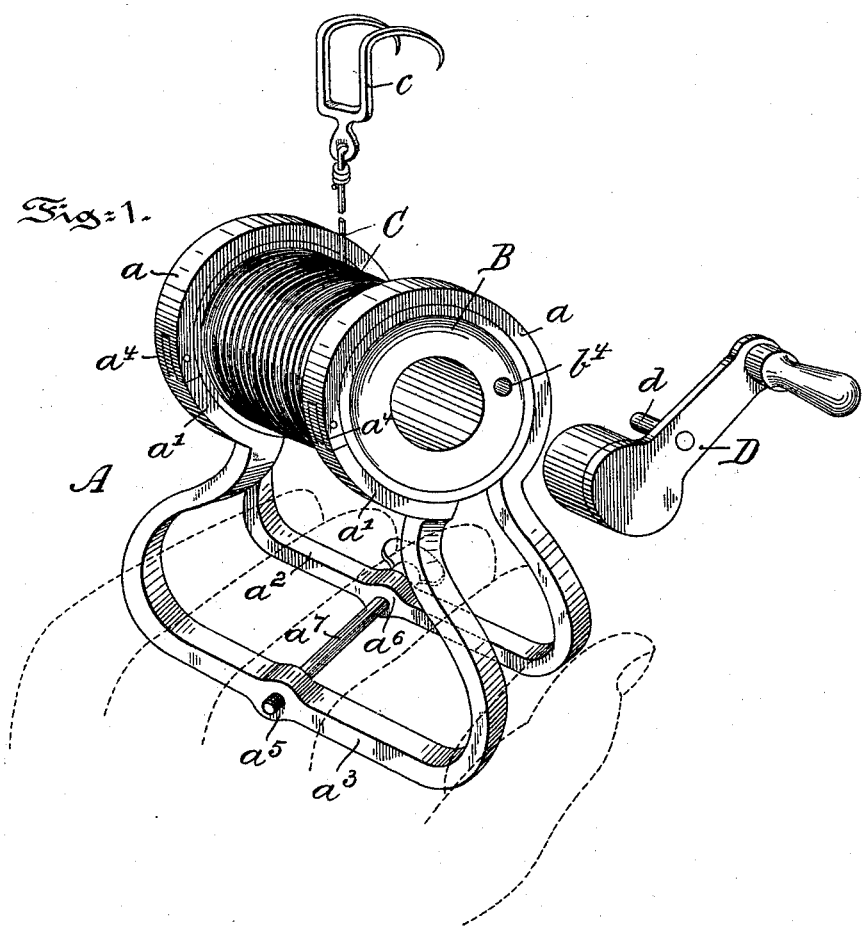
Figure 2:
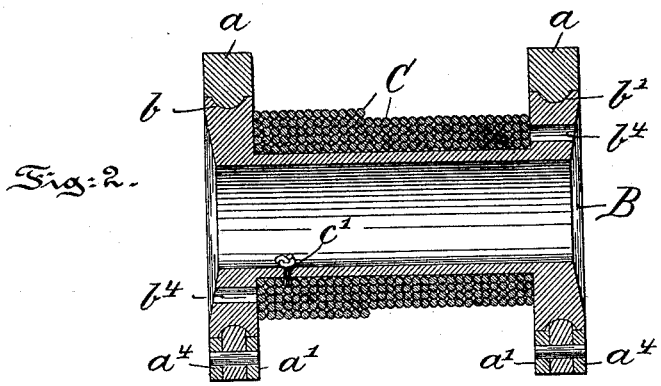

Figure 1 is a perspective view of a portable fire-escape embodying the main features of my invention, showing the grapple-hook connected with the wire or cord wound upon the reel or spool of the device; and Fig. 2 is a horizontal central sectional view of the reel or spool with its holder.

Referring to the drawings, A represents the holder comprising two embracing members $a$ and $a'$, provided with hand-grips $a^2$ and $a^3$, one of said members, with its grip, being fixed, while the other is movable—that is, the grip $a^3$ of the member $a'$ is hinged to, or by a forked connection $a^4$ is established with, the member $a$, as clearly illustrated in Fig. 1, so as to afford a slight spreading and contracting movement of the shorter member $a'$ of the two embracing a reel or spool B about the flanged and grooved portions $b$ and $b'$ thereof. As so arranged the reel or spool cannot become accidentally disengaged from its holder A in the operation of the device. The spool or reel has wound thereon a wire or cord C, and at the free end of the wire or cord is a grapple-hook $c$.

The wire may be fastened through an opening $c'$, provided in the body of the reel or spool B, as clearly illustrated in Fig. 2. The hand-grips about midway in their length are respectively provided with threaded bearings $a^5$ and $a^6$ for the reception of a tightening screw-bolt $a^7$ for drawing together or releasing, as occasion may require, the hand-grips and thereby the members $a$ and $a'$ of the holder A closer to or farther from the grooved portions of the reel or spool B, so as to lessen or increase, as required, the friction between the holder and the reel or spool while the person is suspended by means of a wire or cord C, with the grapple-hook $c$, attached or secured to a window-sill or some other convenient part of a building during escape of the person from a building to a place of safety. D is a hand-crank key adapted to fit into either end of the reel or spool B. This key is provided with a pin $d$, which is adapted to enter an aperture $b^4$ in either end of the spool or reel B, as shown in Figs. 1 and 2, for readily winding upon the reel or spool the wire or cord, so that it may assume the condition illustrated in Fig. 1, ready for use with one hand, as shown in dotted outline in Fig. 1, grasping the two grips $a^2$ and $a^3$ of the holder A.

It will be seen that the hinged holder, with its hand-grips, is so arranged that when once the reel is mounted in the holder in engagement with the grooved portions of the same it will not become detached therefrom, because one of the members $a$—that is, being the fixed member of the holder—extends three-fourths around the spool or reel, while the other member $a'$, which is movable, extends around the remaining fourth of said holder A.

It will be manifestly obvious that as to some minor details of construction and arrangement of the device modifications may be made without departing from the spirit of my invention; and hence,

Having thus described the nature and objects of my invention, what I claim as new, and desire to secure by Letters Patent, is—

A fire-escape, consisting of a reel or spool, a hinged two-part holder adapted to embrace the grooved periphery of the spool at each end thereof, a gripping-handle formed integral with each member of the holder, a tightening-bolt adapted to enter one of said handles and to traverse the other to permit the members of the holder to be adjusted with respect to each other and the spool, a cord adapted to be wound upon the spool between the grooved ends thereof, a grappling-hook secured to the cord and adapted to suspend the spool from a fixture, a shaft and handle adapted to enter the spool, and a pin formed on the handle and adapted to enter a recess in the end of the spool to lock the handle to the spool, substantially as and for the purposes described.

In testimony whereof I have hereunto set my signature in the presence of two subscribing witnesses.

DE LOS RICH.

Witnesses:
 THOMAS M. SMITH,
 RICHARD C. MAXWELL.